No. 753,657. Patented March 1, 1904.

UNITED STATES PATENT OFFICE.

OSCAR BALLY, OF MANNHEIM, GERMANY, ASSIGNOR TO THE BADISCHE ANILIN & SODA FABRIK, OF LUDWIGSHAFEN-ON-THE-RHINE, GERMANY, A CORPORATION OF BADEN.

ANTHRACENE DYE AND PROCESS OF MAKING SAME.

SPECIFICATION forming part of Letters Patent No. 753,657, dated March 1, 1904.

Application filed December 19, 1900. Serial No. 40,446. (Specimens.)

*To all whom it may concern:*

Be it known that I, OSCAR BALLY, doctor of philosophy and chemist, a citizen of the Swiss Republic, residing at Mannheim, in the Grand Duchy of Baden, Germany, have invented new and useful Improvements in Anthracene Dyes and Processes of Making the Same, of which the following is a specification.

It is known that the amido derivatives of anthraquinone and derivatives thereof, as also their substituted amido derivatives and the sulfo-acids of these bodies, can be converted into halogen derivatives by treatment with halogen or halogenizing agents. It is further known that these halogen derivatives react with aromatic amins, giving new coloring-matters.

In this my invention I make use of halogen-containing products, such as can be obtained by suitable halogenation of either mono- or di-amido- or mono- or di-alphyl-amido-anthraquinone or sulfo-acids of the same, which substances I desire hereinafter to be understood as being included in the generic term "amido-anthraquinone substance," and the halogen-containing derivatives of which I desire to have understood as being included in the generic term "halogenated amido-anthraquinone substance." For the broad purpose of my invention I may take a hereinbefore-defined amido-anthraquinone substance, subject the same to a suitable halogenation operation, and may then subject the resulting halogenated amido-anthraquinone substance to the action of ammonia or of agents which produce ammonia during the course of the reaction. In this way coloring-matters are obtained which can either be used at once in dyeing or after previous sulfonation, and the dyed goods possess a high degree of fastness. Various products are obtained, according to the quantity of halogen employed in the halogenizing process, as also to the conditions observed during this operation. As instances of these variations I give the properties of some of the said halogen derivatives that can be obtained according to this invention in the following table:

| Halogen derivative obtained from— | Solution in water. | Solution in alcohol. | In sulfuric acid. | In sulfuric acid and boracic acid at a temperature of one hundred (100°) degrees centigrade. | In moderately-warm anilin. |
|---|---|---|---|---|---|
| Ten (10) parts alpha-anilido-anthraquinone monosulfo-acid and sixteen (16) parts bromin in concentrated aqueous suspension. | Red-orange. | Orange. | Brown. | Brown. | Brownish orange. |
| Ten (10) parts beta-anilido-anthraquinone monosulfo-acid and sixteen (16) parts bromin in concentrated aqueous suspension. | Cherry-red. | Brown-red. | Brown. | Red-violet. | Brownish cherry red. |
| Ten (10) parts beta-anilido-anthraquinone monosulfo-acid and sixteen (16) parts of bromin in dilute aqueous solution. | Red-orange. | Orange-yellow. | Red-brown. | Fuchsin-red. | Brown. |
| Ten (10) parts crude (alpha and beta mixed) anilido-anthraquinone monosulfo-acid and eight (8) parts of bromin. | Violet-red. | Brown-red. | Olive. | Red-violet. | Cherry-red. |
| The same with twelve (12) parts of bromin. | Violet-red. | Brown-red. | Brown. | Red-violet. | Cherry-red. |

| Halogen derivative obtained from— | Solution in water. | Solution in alcohol. | In sulfuric acid. | In sulfuric acid and boracic acid at a temperature of one hundred (100°) degrees centigrade. | In moderately-warm anilin. |
|---|---|---|---|---|---|
| The same with sixteen (16) parts of bromin. | Cherry-red. | Brown-red. | Yellow-brown. | Fuchsin-red. | Brownish cherry-red. |
| The same with thirty-two (32) parts of bromin. | Yellow-red. | Reddish yellow. | Reddish brown. | Carmine-red. | Yellow-brown. |
| Ten (10) parts para-toluidin-anthraquinone sulfo-acid, two (2) parts of potassium chlorate, and fifteen (15) parts of fuming hydrochloric acid. | Cherry-red. | Yellow-red. | Green-olive. | Red-violet. | Red-brown. |

The following examples will serve to illustrate the manner in which my invention may be carried into practical effect; but the invention is not confined to the instances exemplified nor to the conditions given in the examples. The parts are by weight.

Example 1: Suspend ten (10) parts of crude anilido-anthraquinone monosulfo-acid (alpha and beta mixed) in about two hundred (200) parts of water. Treat the mixture at ordinary temperature with twelve (12) parts of bromin and stir well for about twelve (12) hours. Add common salt or potassium chlorid and filter off the bromid formed. Collect and dry in the usual way. Next mix in an autoclave ten (10) parts of the brom-anilido-anthraquinone monosulfo-acid so obtained with fifty (50) parts of aqueous ammonia, (containing about twenty (20) per cent. NH$_3$.) Heat this mixture in the autoclave for about six (6) hours at a temperature of about two hundred (200°) degrees centigrade. Allow it to cool and precipitate the reaction product by means of common salt. Collect the coloring-matter by filtration, press and dry, or preserve for use in the form of paste. The coloring-matter dyes chrome mordanted wool gray-blue to blue-black shades. The coloring-matter is easily soluble in water, giving a brownish-violet solution, which is not changed in color by caustic soda or by sodium carbonate. With concentrated sulfuric acid it gives a brown color.

The product obtained when using the isolated alpha or beta compounds instead of the mixture as prescribed above possesses similar properties.

Example 2: Prepare the brom-anilido-anthraquinone monosulfo-acid as described in the foregoing Example 1, but using sixteen (16) parts of bromin instead of twelve (12) parts. Mix ten (10) parts of the bromination product so obtained with about seventy (70) parts of aqueous ammonia (containing about twenty (20) per cent. NH$_3$) and heat the mixture in an autoclave for about nine (9) hours at a temperature of about one hundred and sixty (160°) degrees centigrade. Precipitate the coloring-matter by means of common salt and collect in the usual way. The coloring-matter so obtained dyes chrome mordanted wool gray-violet to violet-black shades. In a similar manner coloring-matters can be obtained from other brominated or chlorinated derivatives of anilido-anthraquinone sulfo-acid and of the other alphylido-anthraquinone sulfo-acids. In quite an analogous manner coloring-matters can be obtained from halogen derivatives of dialphyl-diamido-anthraquinone sulfo-acid. The said halogen derivatives are new and can be obtained by moderate treatment of the said sulfo-acid with halogen. The production of the coloring-matters from halogen derivatives can be effected according to the data of the foregoing examples. Similarly coloring-matters are obtained from halogen substituted amido- or diamido-anthraquinone sulfo-acids or their corresponding unsulfonated compounds. Such products do not possess the desired solubility in water, but are more soluble on sulfonation.

Now what I claim is—

1. The process of making anthracene dye which consists in acting upon a hereinbefore-defined amido-anthraquinone substance with halogen and then with ammonia.

2. The process of making anthracene dye which consists in acting upon a hereinbefore-defined amido-anthraquinone substance with bromin and then with ammonia.

3. The process of making anthracene dye which consists in acting upon one part of a hereinbefore-defined amido-anthraquinone substance with twelve (12) parts of bromin and then with ammonia.

4. The process of making anthracene dye which consists in acting upon a mixture of crude alpha- and beta-anilido-anthraquinone monosulfo-acid with halogen and then with ammonia.

5. The process of making anthracene dye which consists in acting upon a mixture of crude alpha- and beta-anilido-anthraquinone monosulfo-acid with bromin and then with ammonia.

6. The process of making anthracene dye which consists in acting upon one part of a mixture of crude alpha- and beta-anilido-anthraquinone monosulfo-acid with twelve (12) parts of bromin and then with ammonia.

7. The process of making anthracene dye which consists in acting upon a mixture of halogenated alpha- and beta-anilido-anthraquinone monosulfo-acid with ammonia.

8. The process of making anthracene dye which consists in acting upon a mixture of brominated alpha- and beta-anilido-anthraquinone monosulfo-acid with ammonia.

9. As a new article of manufacture the coloring-matter which can be made from halogenated crude alpha- and beta-anilido-anthraquinone monosulfo-acid and ammonia which is soluble in water and which dyes chrome mordanted wool in shades which are within the range of gray-blue to blue-black.

10. As a new article of manufacture the coloring-matter which can be made from brominated crude alpha- and beta-anilido-anthraquinone monosulfo-acid and ammonia which is soluble in water and which dyes chrome mordanted wool in shades which are within the range of gray-blue to blue-black.

11. As a new article of manufacture the coloring-matter which can be made from the product resulting from the action of one (1) part of a mixture of crude alpha- and beta-anilido-anthraquinone monosulfo-acid upon twelve (12) parts of bromin by treating said product with ammonia which dissolves in water giving a solution of brown-violet color, which is not affected in color by caustic soda or by carbonate of soda, and which gives a brown color with concentrated sulfuric acid.

In testimony whereof I have hereunto set my hand in the presence of two subscribing witnesses.

OSCAR BALLY.

Witnesses:
ERNEST F. EHRHARDT,
MAX H. ESLEO.